Patented Nov. 12, 1946

2,410,894

UNITED STATES PATENT OFFICE 2,410,894

ISOMERIZATION OF NORMAL BUTANE TO ISOBUTANE

Charles W. Montgomery, Aspinwall, Pa., assignor to Gulf Research & Development Company, Pittsburgh, Pa., a corporation of Delaware No Drawing. Application January 17, 1940, Serial No. 314,319

2 Claims. (Cl. 260—683.5)

This invention relates to the production of isobutane; and it comprises an improved method for the production of isobutane from normal butane comprising contacting normal butane in the vapor phase with an aluminum halide catalyst such as aluminum bromide or aluminum chloride distributed throughout a dispersion medium, at a temperature between about 20° and about 150° C., maintaining the ratio of aluminum halide to normal butane greater than the ratio of aluminum halide to normal butane in a saturated solution of the aluminum halide in liquid normal butane, and maintaining a time of contact sufficient to produce substantial isomerization but insufficient to produce cracking, whereby large quantities of normal butane may be rapidly converted to isobutane without substantial loss of raw material or catalyst; all as more fully hereinafter set forth and as claimed.

It has heretofore been proposed to effect isomerization of normal butane to isobutane on a commercial scale by contacting normal butane with an aluminum halide catalyst at an elevated temperature. When commercial rates of production have been obtained the isomerization has been accompanied by excessive cracking of the butane to lower and higher hydrocarbons which causes waste of a large amount of raw material. Furthermore the cracking products combine with the aluminum halide catalyst and render it unfit for repeated use.

In my copending application for United States Letters Patent Serial No. 208,717, filed May 18, 1938, of which this application is a continuation-in-part, I have described a process of isomerizing normal butane in which cracking (i. e. formation of lower and higher hydrocarbons) is substantially prevented, which comprises dissolving an aluminum halide in liquid normal butane at a temperature below the critical temperature of normal butane and maintaining such contact for a sufficient length of time to effect conversion of normal butane to isobutane. However, when conducted in this manner, the isomerization still proceeds relatively slowly even under conditions such that the isobutane is removed from the reaction mixture as fast as it is formed.

I have found that the cracking reaction which accompanies isomerization at elevated temperatures is a much slower reaction than the isomerization at temperatures below 150° C. and that employing a sufficiently short time of contact of normal butane with an aluminum halide catalyst it is possible to carry out the isomerization at temperatures below 150° C. substantially without cracking or the production of lower and higher hydrocarbons. However, reducing the time of contact likewise tends to decrease the yield of isobutane, and in order to obtain commercial rates of production of isobutane particularly at temperatures below about 150° C. it is necessary to increase the rate of isomerization.

I have discovered that the rate of isomerization of normal butane can be considerably increased by employing a catalyst concentration greater than can be obtained by saturating liquid normal butane with an aluminum halide, and that by contacting normal butane in the vapor phase at a temperature not exceeding about 150° C. with an aluminum halide catalyst, preferably aluminum bromide, in a dispersed condition, in such manner that the proportion of catalyst to normal butane during the reaction is greater than the proportion of catalyst to n-butane in liquid n-butane saturated with the aluminum halide, the normal butane can be converted to isobutane quite rapidly and that by employing short periods of time of contact of n-butane with the catalyst usually about 1 to 300 seconds, commercial production of isobutane can be obtained without substantial cracking. I have further found that if the reaction is carried out in the presence of anhydrous hydrogen halide, continuous operation can be effected without replacement or regeneration of the catalyst. In this way I have been able to convert n-butane to isobutane in amounts as high as 30 per cent per minute without substantial cracking.

Although both aluminum bromide and aluminum chloride are effective for the conversion of substantial amounts of n-butane to isobutane according to the method of my invention, I have found that aluminum bromide is a more active catalyst for the reaction than aluminum chloride. For example, at any given temperature with corresponding contact periods a substantially larger percentage conversion of n-butane to isobutane is obtained with a dispersed aluminum bromide catalyst than with aluminum chloride. The initial cost of aluminum bromide is substantially higher than that of aluminum chloride. However, since there is substantially no loss of catalyst in the process when cracking is avoided, and since aluminum bromide is more efficient, I find its use more advantageous.

A dispersed aluminum halide catalyst suitable for use according to the method of my invention may be formed by dissolving the aluminum halide in a solvent in which it has a greater solubility than in liquid n-butane. The amount of aluminum halide dissolved in the solvent should be greater than the saturation solubility of the aluminum halide in n-butane. The solution may then be saturated with n-butane. The catalyst thus prepared is ready for use. n-Butane vapor is passed through the liquid catalyst, usually with vigorous agitation, and the gaseous mixture of isobutane and n-butane which is given off is separated by fractionation.

Another method of forming a suitable dispersed aluminum halide catalyst according to my invention is to produce a suspension of aluminum halide in a liquid. It is not necessary that the aluminum halide be more soluble in the particular liquid than it is in liquid n-butane, but only that a total concentration of aluminum halide, dissolved and suspended, be obtained, which is greater than can be obtained by merely dissolving the aluminum halide in liquid n-butane. As in the case of a solution of aluminum halide, n-butane vapor is passed through the fluid catalytic medium, advantageously with vigorous agitation, and the effluent mixture of iso- and n-butane vapor is fractionated to separate the constituents.

Examples of dispersing liquids suitable for producing the solutions or suspensions of this invention are carbon disulfide, liquid butane and the like, the lower halogenated hydrocarbons such as carbon tetrachloride, chloroform, ethyl bromide, methyl bromide and methyl chloride and the like. These liquids vary considerably in their solvent power for aluminum halides, volatility and other physical and chemical properties. They have in common, however, the characteristics that they do not form stable addition complexes with aluminum halides and that they do not react with aluminum halides to produce undesirable byproducts.

Still another form of dispersed aluminum halide catalyst which I have found suitable for use according to the method of my invention is a solid catalyst prepared by forming a surface encrustation of the aluminum halide on an inert catalyst carrier of the type well known in the art such as pumice, clay or ceramic particles or the like. The encrustation of aluminum halide may be formed by any suitable means; for example, by wetting the pumice or other material with a solution of the aluminum halide in a volatile solvent and subsequently volatilizing the solvent, or by dusting a powdered aluminum halide on the support, or by subliming the aluminum halide and condensing it on the inert support. After the solid catalyst is thus prepared the n-butane vapor may be passed through a porous mass of the catalyst at a rate and in such concentration that the proportion of aluminum halide to n-butane is always greater than the proportion of aluminum halide to n-butane in a saturated solution of the catalyst in liquid n-butane. The gaseous effluent containing a substantial proportion os isobutane mixed with n-butane may be separated by fractionation.

The percentage of n-butane converted to isobutane varies with the contact time and the temperature as well as with the form of catalyst used. However, with contact in the order of one to 300 seconds at temperatures below about 150° C. satisfactory commercial production can be obtained without substantial cracking or formation of higher and lower hydrocarbons.

In general a temperature of at least about 20° C. is required to effect substantial conversion of the n-butane to iso-butane. The time of contact required at this temperature is usually too long for good commercial production but may be used and isomerization without any substantial cracking can be obtained. Commercially advantageous rates of isomerization are usually obtained at about 50° C. and above. The maximum contact time which may be used at this temperature without cracking will vary with the particular aluminum halide catalyst used and the form of the catalyst, substantially longer contact times being permissible with aluminum chloride catalysts than with aluminum bromide catalysts. Furthermore it is necessary in order to obtain comparable yields of isobutane that longer contact times be used with aluminum chloride catalysts than with aluminum bromide catalysts. At about 50° C. contact times on the order of 60 to 300 seconds may be used without cracking, depending on the particular form of dispersed aluminum halide catalyst used.

In order to prevent substantial cracking without employing excessively short times of contact, I have found that the temperature should be maintained below the critical temperature of n-butane, that is to say, about 150° C. or below with either an aluminum chloride or an aluminum bromide catalyst. As higher temperatures between about 50° C. and about 150° C. are used the reaction rate increases along with an increase in the tendency to cracking and shorter periods of contact must be used in order to prevent the formation of the higher and lower hydrocarbons. At 150° C. the permissible contact times to prevent cracking are on the order of 1.0 to 40 seconds depending on the particular aluminum halide catalyst used and its form.

When aluminum bromide is used as the catalyst, the temperature used is advantageously not above about 120° C. as times of contact sufficiently small to prevent substantial cracking at substantially higher temperatures with this catalyst are very short. However, temperatures between 120° C. and 150° C. can be used with aluminum bromide. A particular disadvantage of such operation is that the rate of flow of gases necessary to maintain the low contact time is usually so great that the aluminum bromide may be volatilized at the prevailing temperature and carried off by the gas. On the other hand, a temperature above about 50° C. is advantageously maintained because at lower temperatures the rate of isomerization is undesirably low.

When aluminum chloride is used as the catalyst, temperatures between 100° and 150° C. are most efficient. High yields can be obtained without substantial cracking using contact times of about 40 seconds or more. Temperatures between about 50° and 100° C. can also be used with aluminum chloride catalysts and contact times on the order of 225 to 300 seconds.

In the following table there are shown several examples of the ratio of contact time and temperature required to produce incipient cracking with particular dispersed aluminum chloride and aluminum bromide catalysts respectively:

| Temp. | Aluminum chloride time for incipient cracking | Aluminum bromide time for incipient cracking |
|---|---|---|
| 50 | 5 minutes | 65 seconds. |
| 99 | 4 minutes | 5 seconds. |
| 123 | | 2 seconds. |
| 142 | 42 seconds | |
| 150 | 40 seconds | 1 second. |

In all cases represented by the above table, the catalysts were of the aluminum halide-on-pumice type. The aluminum chloride catalyst was prepared by subliming aluminum chloride onto pumice whereas the aluminum bromide catalyst was prepared by wetting pumice with a solution of aluminum bromide in isopentane and evaporating off the solvent. Each catalyst contained 35 per cent by weight of aluminum halide. The aluminum chloride catalyst was capable of producing 38 per cent isomerization without cracking at 142° C. and 1 minute time of contact. The aluminum bromide catalyst was capable of producing 50 per cent isomerization without cracking at 50° C. and 1.1 minute time of contact. Both aluminum chloride and aluminum bromide catalysts formed in other ways will however be somewhat different in their tendency to produce cracking.

The activity of the dispersed catalyst, whether it be aluminum bromide or aluminum chloride in solution or in a dispersed solid state in a liquid or on a solid, ordinarily gradually decreases as the total amount of n-butane vapor contacted with it increases. When the activity has decreased to a point where efficient operation is no longer possible the catalyst may be regenerated by treatment with anhydrous hydrogen halide. By treatment of the catalyst with a suitable amount of hydrogen halide the original activity can be substantially completely restored. The regenerated catalyst is, however, subject to the objection that on treatment of further amounts of n-butane it loses activity more rapidly than a fresh catalyst.

I have found, however, that decrease in catalyst activity and the necessity for regeneration can be avoided by mixing a small percentage of anhydrous hydrogen halide with the n-butane vapor being contacted with the catalyst. By contacting n-butane vapor containing about 0.1 to about 10.0 per cent of a hydrogen halide with the dispersed aluminum halide catalyst the n-butane is converted to isobutane without any substantial loss in catalyst activity. Thus by the use of such a mixture it is possible to carry out the process continuously by recirculating the unconverted n-butane in contact with the catalyst after separation of the isobutane. In general I find it more advantageous therefore to pass n-butane vapor containing about 0.1 to about 10 per cent of a hydrogen halide in contact with the catalyst.

My invention will be described hereinafter in more detail in connection with three specific types of dispersed catalysts including a solution of aluminum halide, a suspension of aluminum halide in a liquid, and an aluminum halide catalyst supported on a solid catalyst carrier respectively which I have found satisfactory for my purposes.

One method which I have found satisfactory for obtaining the beneficial effect of catalyst: n-butane ratios greater than the limits imposed by the solubility of the catalyst in liquid n-butane is to pass n-butane vapor through a solution of aluminum bromide in carbon disulfide at a temperature of about 20° to 50° C. At a temperature of 30° C. aluminum bromide is soluble in carbon disulfide to the extent of about 70 per cent by weight (40 mol per cent). It is generally desirable to saturate the solvent with the aluminum bromide at the temperature at which the reaction is to be carried out. Accordingly, the carbon disulfide is generally saturated with aluminum bromide although concentrations somewhat below the saturation solubility limit may be used if desired. After the solution of aluminum bromide in carbon disulfide has been prepared, normal butane, either liquid or gaseous, is added to the solution until no more dissolves.

n-Butane vapor may be passed through this catalyst mixture in any suitable apparatus. It is generally desirable that the catalyst mixture be well agitated. The percentage conversion of the n-butane to isobutane will vary with the rate of flow of gaseous n-butane introduced into the system. However, even with very low contact times obtained with relatively high rates of flow the percentage conversion of n-butane to isobutane is much greater than in ordinary operation employing a solution of aluminum bromide in liquid n-butane.

The effluent gas containing a mixture of n-butane and isobutane may be separated into its components in any suitable manner, for example, by fractionation, and the n-butane can be recirculated for further conversion. The catalyst mixture has a relatively long useful life and loses its activity only very slowly. Loss in activity of the catalyst can be prevented by adding to the n-butane vapor passed through the catalyst mixture about 0.1 to about 10 per cent of hydrogen bromide.

An example of a satisfactory suspended catalyst in a liquid medium is the use of aluminum chloride suspended in chloroform. A suitable suspension of aluminum chloride in chloroform may be prepared by mixing about 23 mol per cent of aluminum chloride with this chloroform. This amount is substantially greater than the saturation solubility of aluminum chloride in chloroform and some undissolved aluminum chloride remains in suspension. This suspension also contains much more aluminum chloride per unit volume than a saturated solution of aluminum chloride in liquid n-butane, and produces a higher ratio of catalyst to n-butane than could be produced with a solution of aluminum chloride in liquid n-butane. Gaseous n-butane may be passed through 100 volumes of this suspension, for example, at a temperature of 50° C. and at a rate of flow of 25 volumes per minute to yield about 30.2 per cent isobutane. Similar results are obtainable with suspensions of aluminum chloride in carbon tetrachloride and in carbon disulfide.

An example of operation in which the beneficial effect of increased catalyst concentration is obtained by passing n-butane vapors over a solid aluminum halide catalyst distributed on the surface of an inert support, at a temperature below 100° C. is illustrated by the use of aluminum bromide deposited on pea-sized pumice stone.

The catalyst may be prepared by first saturating a liquid paraffin hydrocarbon, advantageously isopentane, with anhydrous aluminum bromide and pouring the solution thus formed over a quantity of pea-sized pumice. After the pumice has been thoroughly wetted with the solution the isopentane or other hydrocarbon used as a solvent can be pumped off under vacuum leaving on the surface of the pumice an adhering encrustation of crystalline aluminum bromide. A catalyst prepared in this way is quite active and contains ordinarily about 30 to 50 per cent by weight of aluminum bromide. Isopentane is particularly suitable for dissolving the aluminum bromide in the preparation of the catalyst. It is readily volatile and is easily removed by evacuation and does not form sludge readily even in the presence of high concentrations of aluminum bromide.

The n-butane vapor may be contacted with the solid catalyst thus prepared, in various ways. I have found it most convenient simply to pass the gas through a chamber packed with the pumice supported catalyst and provided with a temperature regulating means. In most cases I find it advantageous to use a temperature of about 50° to 70° C. and contact times between about 65 and 40 seconds.

The efficiency of the aluminum bromide as a catalyst decreases with increase in the amount of n-butane contacted with it. However, after the catalyst activity has decreased below the desired standard, it may be regenerated by flushing the system with anhydrous hydrogen bromide. Alternately, the decrease in catalyst activity can be prevented by continuously adding about 0.1 to about 10 per cent of hydrogen bromide to the n-butane. Continuous operation may thus be effected.

Even after long continued operation in this manner, no substantial amount of tarry deposit is formed on the catalyst and substantially no formation of higher or lower paraffins is noted, indicating that no substantial amount of cracking has taken place during the operation. High percentage conversions of n-butane to isobutane are obtained. The percentage conversion varies with the contact time, which may be regulated by the rate of flow at which n-butane is introduced into the system. With a space velocity of about one per minute a conversion of n-butane to isobutane amounting to 30 to 40 per cent can be obtained and with longer contact time the conversion can be made to approach the theoretical limit of 75 to 85 per cent.

In the following examples are illustrated the results obtained in passing n-butane vapor over a solid aluminum bromide catalyst distributed on a pumice support at temperatures below the melting point of aluminum bromide and under pressure just sufficient to produce the desired rate of flow of the vapor through the system.

One hundred five grams of aluminum bromide distributed on pumice, prepared by thoroughly wetting pea-sized pumice with isopentane saturated with aluminum bromide and then pumping off the isopentane, was placed in a glass tube surrounded by a water jacket. The temperature of the catalyst was adjusted to 50° C. and maintained constant throughout the experiment. Gaseous n-butane at one atmosphere pressure was passed through the catalyst mass at a constant flow rate of 70 cc./minute (S. T. P.) giving a contact time of approximately one minute. Samples of effluent gas were taken from time to time and were analyzed for isobutane giving the following results:

| Total throughput, liters | Per cent isobutane |
|---|---|
| 1.55 | 23.0 |
| 19.7 | 11.4 |
| 40.2 | 10.8 |

It was observed that the catalyst activity decreased as the amount of n-butane passed through the catalyst increased. Accordingly, the catalyst was regenerated by flushing the system with anhydrous hydrogen bromide until the initial rate of conversion was restored. n-Butane was passed through the catalyst and samples of the effluent gas were taken as before. On analysis these samples showed the following results:

| Total throughput, liters | Per cent isobutane |
|---|---|
| 1.55 | 22.8 |
| 14.4 | 12.0 |
| 27.3 | 5.5 |

These results indicate a more rapid decrease in catalyst activity after regeneration than before.

A similar test conducted on a fresh batch of catalyst with the same contact time but at a temperature of 30° C. gave the following results:

| Total throughput, liters | Per cent isobutane |
|---|---|
| 1.55 | 7.6 |
| 15.5 | 7.1 |
| 27.2 | 3.3 |

These results indicate that at 30° C. the initial rate of conversion is only about one-third of that obtained at 50° C. However, the decrease in catalyst activity was relatively low and a fairly constant rate or conversion was obtained during the passage of the first fifteen liters of gas.

The following data indicate the effect of increased contact time on the percentage of n-butane converted to isobutane. In carrying out these tests the temperature was maintained at 30° C. and the rate of flow of n-butane was varied to produce different contact periods. The following data were obtained.

| Total throughput, liters | Contact time, minutes | Percent isobutane |
|---|---|---|
| 1.55 | 1.2 | 12.4 |
| 3.15 | 2.8 | 16.1 |
| 4.47 | 7.4 | 24.7 |

As is indicated by these results a relatively long contact time is advantageous when high conversion per pass of n-butane is desired.

In the following set of data the advantageous effect of the continuous addition of hydrogen bromide with the n-butane rather than intermittent regeneration is illustrated. In these tests anhydrous hydrogen bromide generated by the reaction of bromine with tetralin was passed into the inlet stream of n-butane at an approximately constant rate amounting to about 5 to 10 per cent of the total inlet gas. An n-butane flow rate of 70 cc. per minute giving a contact time of one minute was used at temperatures of 30° and 50° C. The results obtained were as follows:

| Temperature, °C. | Total throughput, liters | Percent isobutane |
|---|---|---|
| 30 | 1.7 | 11.6 |
| 30 | 9.4 | 14.3 |
| 30 | 17.4 | 12.6 |
| 50 | 1.7 | 28.3 |
| 50 | 14.0 | 30.6 |
| 50 | 27.3 | 28.3 |

As shown by these results, continuous addition of small amounts of hydrogen bromide with the inlet vapor completely prevents any decrease in catalyst activity.

In the following examples the results obtainable using a dispersed solid aluminum chloride catalyst are illustrated. In these tests a catalyst formed by subliming anhydrous aluminum chloride on pumice was used. n-Butane vapor was passed through a mass of the catalyst at a temperature of about 98° C. and at a rate of flow sufficient to give a contact time of 4.4 minutes. In one test in which a total of 1125 cc. of n-butane were passed over the catalyst without the addition of any hydrogen chloride, 11.3 per cent of isobutane was produced. A corresponding test in which 1.0 to 5.0 per cent of anhydrous hydrogen chloride was added to the n-butane, showed, after the passage of 1125 cc. of n-butane, about 18.4 per cent conversion to isobutane. It will be observed from these tests that even at relatively high temperatures the percentage conversion using aluminum chloride is lower than when aluminum bromide is used as the catalyst.

While I have described my invention herein in connection with certain specific embodiments thereof, it is to be understood that such embodiments are recited by way of example and I do not intend that my invention shall be limited thereto except as hereinafter recited in the appended claims.

What I claim is:

1. An improved process of producing isobutane from normal butane which comprises contacting normal butane vapor at a temperature between about 20° C. and about 150° C. with a solution of an aluminum halide catalyst in a liquid which does not form stable addition complexes with aluminum halides and does not react with aluminum halides to produce undesirable by-products, maintaining a ratio of aluminum halide in solution to normal butane greater than the ratio of aluminum halide to normal butane in a saturated solution of the aluminum halide in liquid normal butane at the contacting temperature, and maintaining a time of contact sufficient to produce substantial isomerization without substantial cracking.

2. An improved process of producing isobutane from normal butane which comprises contacting normal butane vapor at a temperature between about 20° C. and about 150° C. with a suspension of an aluminum halide catalyst in a liquid which does not form stable addition complexes with aluminum halides and does not react with aluminum halides to produce undesirable by-products, maintaining a ratio of aluminum halide to normal butane greater than the ratio of aluminum halide to normal butane in a saturated solution of the aluminum halide in liquid normal butane at the contacting temperature, and maintaining a time of contact sufficient to produce substantial isomerization without substantial cracking.

CHARLES W. MONTGOMERY.